United States Patent

[11] 3,631,965

[72] Inventors Lev Nikolaevich Koshkin
M. Pionersky pereulak 3, kv. 65, Moscow;
Alexei Sergeevich Zazhigin, prospekt 50
letia Artyabrya 10/6 kv. 10; Vitaly
Matveevich Tanygin, prospekt 50 letia
Oktyabrya 10/6 kv. 8, both of Klimovsk
Moskovskoi Oblasti; Valentin Petrovich
Chagin, ulitsa podolskikh Kursantov, 6, kv.
12; Vasily Iosipovich Khomenko,
herolixelsioxny prospekt 52/39 kv. 61, both
of Podolsk Moskovskoi Oblasti, all of
U.S.S.R.
[21] Appl. No. 856,440
[22] Filed Sept. 9, 1969
[45] Patented Jan. 4, 1972

[54] CONVEYOR FOR ASSEMBLING APERTURED
WORKPIECES ADAPTED TO BE RECEIVED ONE
WITHIN ANOTHER
5 Claims, 4 Drawing Figs.

[52] U.S. Cl. .................................................. 198/131,
59/4
[51] Int. Cl. ................................................. B65g 17/42,
B21 9/06
[50] Field of Search .......................................... 198/131;
226/75; 59/4, 7, 25

[56] References Cited
UNITED STATES PATENTS
2,651,607 9/1953 Harris ........................... 198/131 X
2,703,239 3/1955 Curran et al. ................. 226/75

Primary Examiner—Joseph Wegbreit
Assistant Examiner—Bruce H. Stoner, Jr.
Attorney—Waters, Roditi, Schwartz & Nissen ABSTRACT: A conveyor for assembling apertured workpieces adapted to be received one within another, comprising a conveyor chain with external and internal links, pivotally connected with one another, each connection including a bushing sleeve having an axial duct therethrough, a cylindrical assembling mandrel extending through the axial duct of each bushing sleeve, the mandrels being displaceable in relation to the links of the conveyor chain, each mandrel having a tail portion at the upper end thereof, the tail portions of the mandrels being adapted to extend through the apertures in the workpieces being assembled, each mandrel having at least two radially projecting splines extending longitudinally thereof, the internal shape of the axial duct within each bushing sleeve being complementary to the shape of that portion of the mandrel, which is adapted to extend through this axial duct.

CONVEYOR FOR ASSEMBLING APERTURED WORKPIECES ADAPTED TO BE RECEIVED ONE WITHIN ANOTHER

The present invention relates to conveyors for assembling workpieces adapted to be received one within another.

In one known kind of conveyor for assembling apertured workpieces adapted to be received one within another, the conveyor chain includes external and internal links pivotally connected to one another, the pivotal connections between the adjacent links including bushing sleeves with axial ducts, with a cylindrical assembling mandrel extending through each one of said axial ducts, the mandrels being both vertically reciprocable and rotatable in relation to the conveyor links. In the conveyors of this known kind the mandrels are shaped as cylindrical stems provided with sockets which can receive portions of the workpieces being assembled.

However, conveyors of this known kind are not capable of assembling the internal links of driving chains belonging to the roller or roller-and-sleeve types, on account of the socket in the mandrels not providing for the roller and the sleeve of a chain link to be centered, therein in relation to the sideplate of the link of the chain being assembled.

Moreover, this cylindrical mandrel in the known conveyors is not adapted to receive workpieces fed thereto by automatically operating feeding devices.

The present invention has for its aim the provision of a conveyor for assembling workpieces adapted to be received one within another, which will be capable of centering the roller and the sleeve of a chain link being assembled in relation to the respective apertures in the sideplates of such link, and which will also be capable of taking the workpieces to be assembled off automatically operating feeding devices, and thus which will be capable of assembling the internal links of driving chains of the roller or roller-and-sleeve types.

This aim is achieved in a conveyor, wherein, in accordance with the present invention, each of the mandrels has a tail portion adjacent to the upper extremity thereof, said tail portions of said mandrels being adapted to extend through the apertures in the workpieces being assembled, each one of said mandrels having at least two radially projecting splines extending longitudinally thereof, the internal shape in the axial duct within each one of the bushing sleeves of the conveyor links being complementary to that portion of said mandrel, which is adapted to extend through said axial duct.

The present invention will be better understood from the following detailed description of an embodiment thereof, with due reference being made to the accompanying drawings, wherein.

Figure 1:
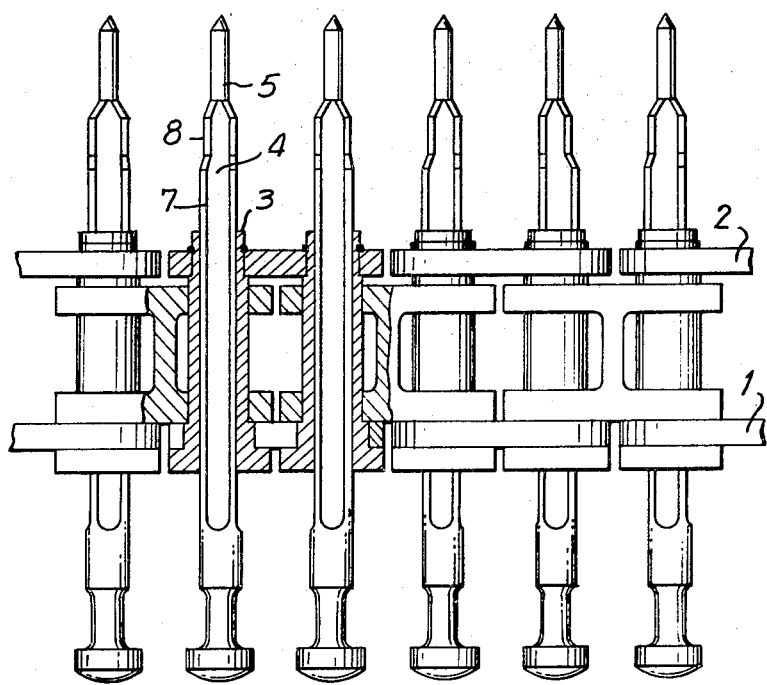
FIG. 1 is a partly sectional side view of a conveyor for assembling apertured workpieces adapted to be received one within another, embodying invention.
Figure 2:
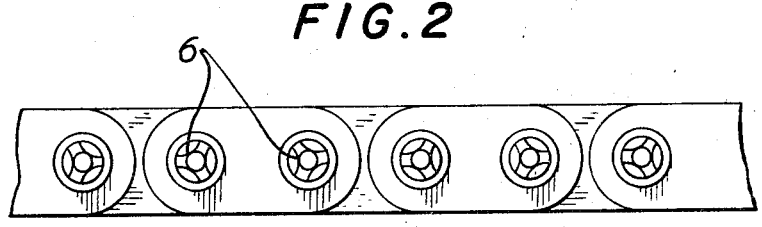
FIG. 2 is a plan view of the conveyor shown in FIG. 1.

Referring now to the drawings, a conveyor for assembling the internal links of driving chains of the roller or sleeve-roller types comprises a plurality of alternating internal links 1 and external links 2 (FIG. 1 and 2), pivotally interconnected by means of hollow bushings 3.

Received axially through the bushings 3 are cylindrical carriers, or mandrels 4 which are displaceable in relation to the links 1 and 2.

Each one of the mandrels 4 has a tail portion 5 adjacent the upper extremity thereof, this tail portion 5 being of a reduced diameter and serving to guide the workpieces received on the mandrel 4, i.e. to extend through and guide the parts of a chain link being assembled on the mandrel 4. The body portion of each mandrel 4 has several axially extending splines 6 made thereon; it also has two longitudinally spaced stepped portions 7 and 8 of different diameters.

The lower portion 7 of a larger diameter is means to receive the bottom plate and the roller of the link of a chain being assembled to be received and centered thereabout, whereas the upper portion 8 of a smaller diameter is intended to receive the sleeve of the link of the chain being assembled to be received and centered thereon.

Axial ducts inside the bushings 3 are shaped to receive the respective mandrels 4.

Figure 3:
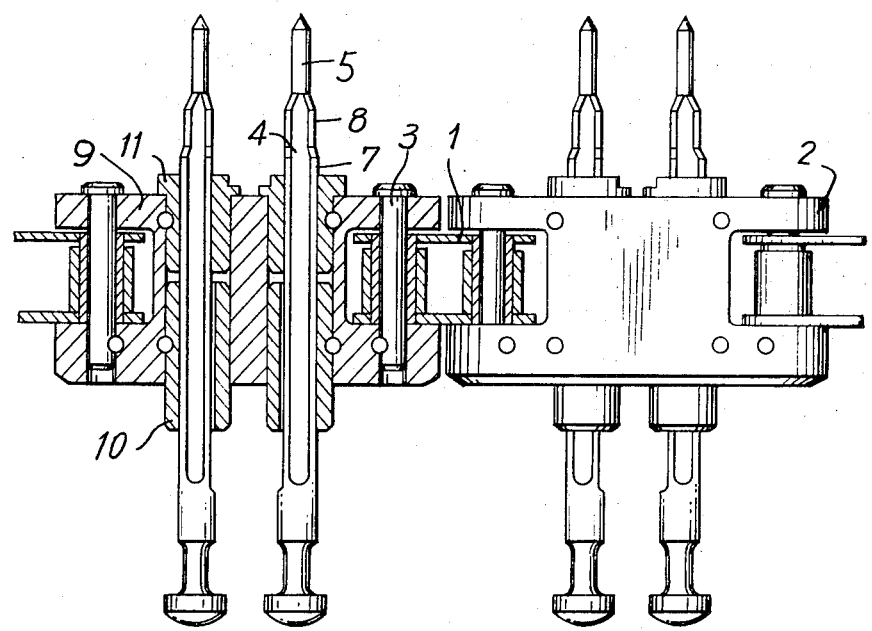
FIG. 3 shows a side view of the external link of a conveyor, embodying the invention made in the form of an integral block.
Figure 4:
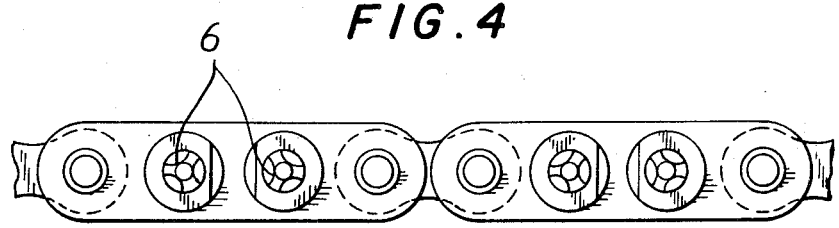
FIG. 4 is a plan view of the link shown in FIG. 3.

Another modification of the links of the conveyor chain, embodying the invention, is possible, wherein the links are made in the form of integral blocks 9 (FIGS. 3 and 4), each block having a pair of openings made therethrough, the opening receiving thereinside the respective bushings 10 and 11 having axial ducts formal therein, the ducts being spline shaped to match the external shape of the mandrels 4, so that the mandrels can extend nonrotatively through these ducts.

The conveyor, embodying the invention, operates, as follows.

The respective feeding turrets (not shown) put the constituent parts of an internal link of a driving chain successively onto each one of the mandrels 4, so that each mandrel receives thereabout, in succession, the bottom plate of the link, the roller, the sleeve and the top plate. The parts of the link are loaded onto a mandrel 4 by the tail portion 5 of the mandrel being introduced into the corresponding aperture provided in the respective part, while the latter is supported by the feeding turret, whereafter the mandrel carries the part away from the turret, as the conveyor leaves the turret. The bottom plate of the link is received about the lower stepped portion 7 of the mandrel 4 and is centered thereon, as well as the roller of the link; whereas the sleeve of the link is received and centered about the upper stepped portion 8 of the mandrel 4.

When in the course of the following operations of assembling the driving chain, the sleeves are press fit into the apertures of the bottom plates of the links, the butt end portion of the bushing 3 with its radially projecting splines of the axial duct serves a support for the bottom face of the sleeve as the latter is driven into the aperture of the bottom whole width of the plate. The top plates of the links of the driving chain being assembled are carried by the tail portions 5 of the mandrels 4, until they reach a special turret (not shown) where they are press fitted from above onto the sleeves.

What is claimed is:

1. A conveyor on which apertured workpieces are received one within another for assembly on the conveyor, said conveyor comprising: a plurality of internal links; a plurality of external links; a plurality of bushings interconnecting respective pairs of external and internal links of said conveyor, said bushings having axial ducts therethrough with radially projecting splines extending in the axial direction of said ducts; a plurality of cylindrical mandrels having splines extending longitudinally thereof, each mandrel including a longitudinal portion of external shape substantially complementary to that of said axial duct of said bushing; each of said mandrels further including a tail portion adapted to extend through respective apertures provided in said workpieces being assembled; said mandrels being at least partially received within said axial ducts of the respective of said bushings, and being in splined engagement therewith so that said mandrels are rotatably coupled with said bushings while being axially displaceable relative to said links of said conveyor.

2. A conveyor as claimed in claim 1 wherein each said mandrel comprises two longitudinally spaced, projecting portions of different diameter, said tail portion being on the free end of the outer projecting portion.

3. A conveyor as claimed in claim 2 wherein said splines on the mandrels extend along the length thereof inclusive of said projecting portions.

4. A conveyor as claimed in claim 1 wherein said tail portion and two longitudinally projecting portions have stepwise-increasing diameters.

5. A conveyor as claimed in claim 1 wherein said bushings have opposite ends both of which project beyond said external links.

* * * * *